June 24, 1930.  S. W. VOLLINK  1,765,467
TRANSPLANTER
Filed Jan. 29, 1927   3 Sheets-Sheet 1
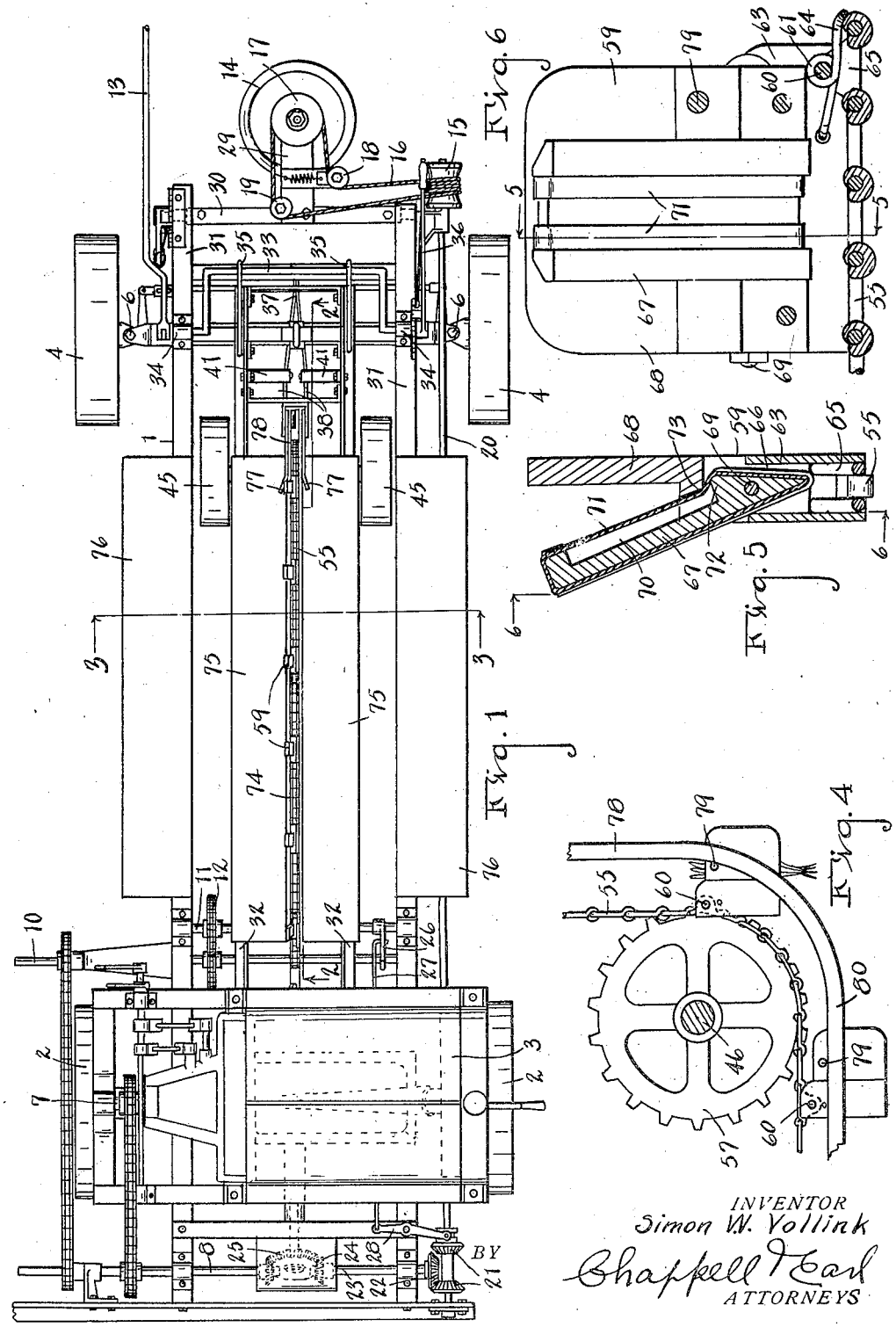
INVENTOR
Simon W. Vollink
BY Chappell & Earl
ATTORNEYS June 24, 1930.  S. W. VOLLINK  1,765,467
TRANSPLANTER
Filed Jan. 29, 1927   3 Sheets-Sheet 2
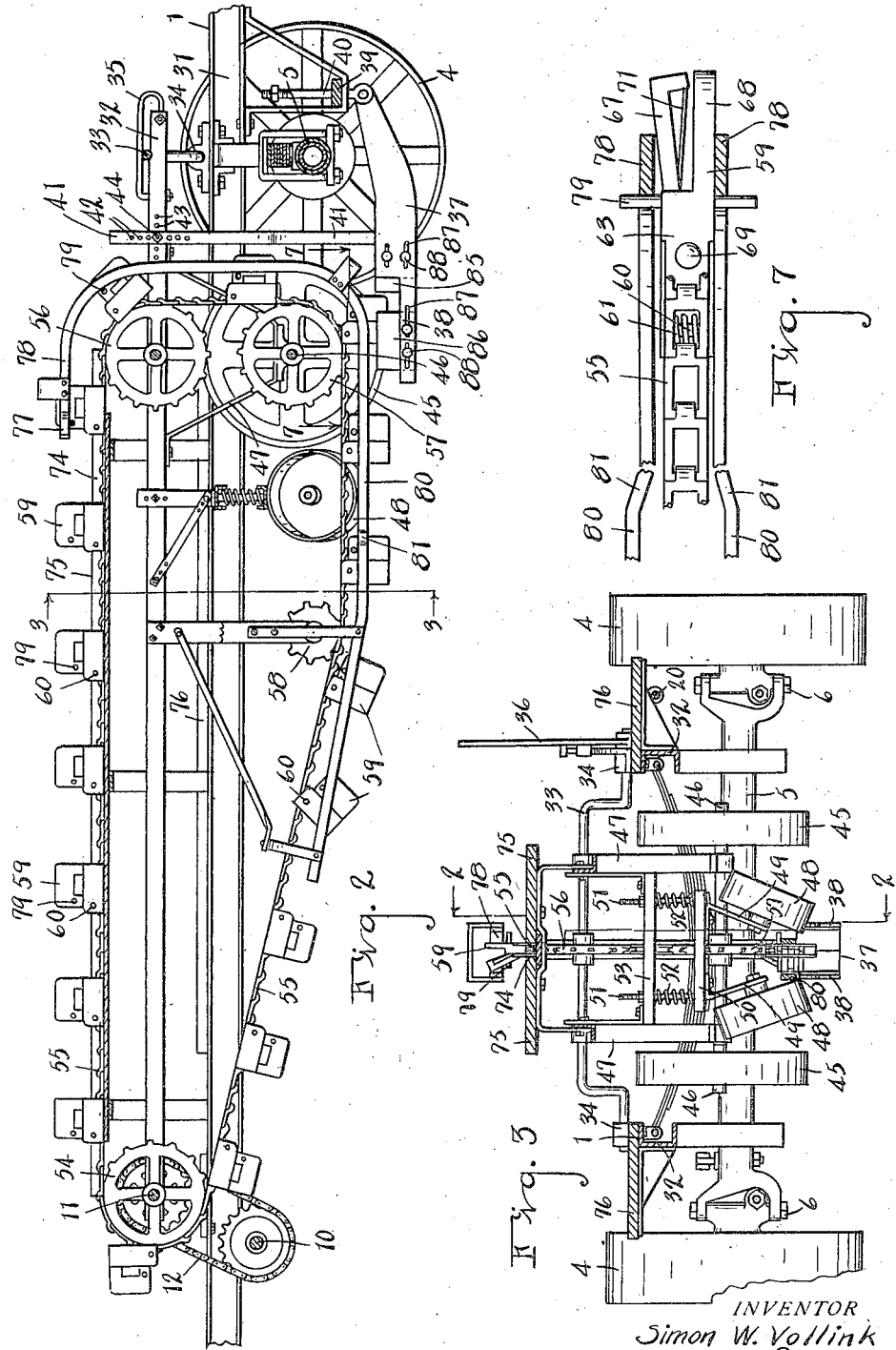
INVENTOR
Simon W. Vollink
BY
Chappell & Earl
ATTORNEYS

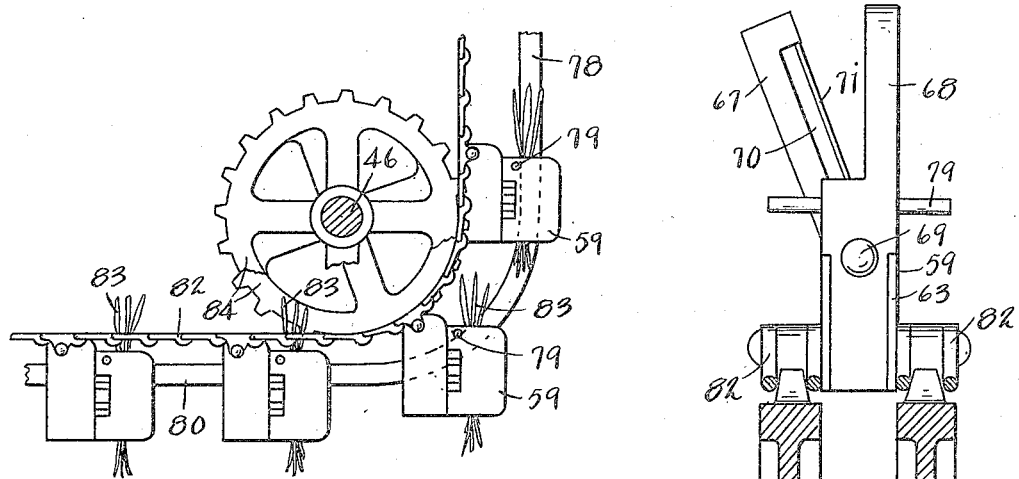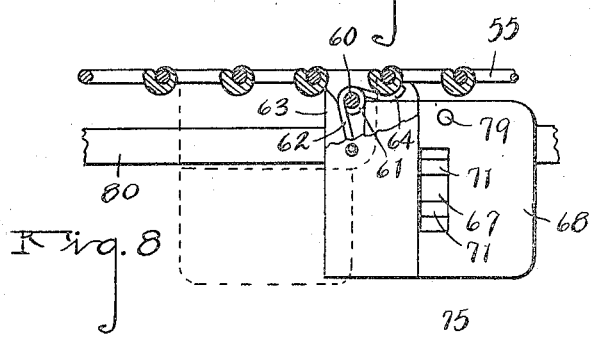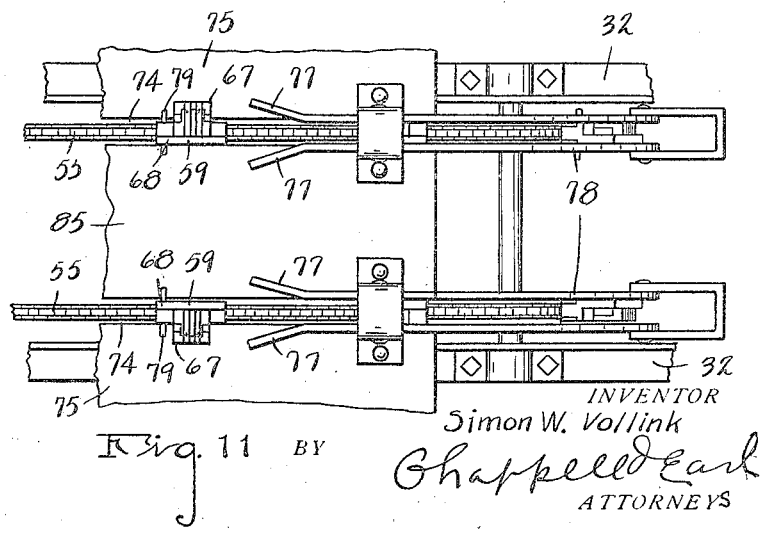

Patented June 24, 1930

1,765,467

UNITED STATES PATENT OFFICE

SIMON W. VOLLINK, OF HASTINGS, MICHIGAN

TRANSPLANTER

Application filed January 29, 1927. Serial No. 164,480.

The main objects of this invention are:

First, to provide a transplanting machine adapted for the transplanting of relatively small plants such as celery, beets, cabbage and tomato plants and the like.

Second, to provide a transplanting machine of the character described which is adapted for the setting of relatively delicate plants on a large scale without injury thereto.

Third, to provide a transplanting machine which is of very large capacity and may be operated with a minimum of labor on the part of the operators.

Objects pertaining to details and economies of my invention will definitely appear from the detailed description to follow. The invention is clearly defined and pointed out in the claims.

A structure embodying the features of my improvements is clearly illustrated in the accompanying drawing forming a part of this application, in which:

Fig. 1 is a plan view of a structure embodying the features of my invention, certain parts being shown conventionally for convenience in illustration.

Fig. 2 is a fragmentary vertical longitudinal section on a line corresponding to line 2—2 of Figs. 1 and 3.

Fig. 3 is a fragmentary transverse section on a line corresponding to line 3—3 of Figs. 1 and 2.

Fig. 4 is a fragmentary section showing details of the control means for the plant holder.

Fig. 5 is a section on line corresponding to line 5—5 of Fig. 6 through one of the plant holders.

Fig. 6 is a detail section on a line corresponding to line 6—6 of Fig. 5.

Fig. 7 is a fragmentary view partially in section on line 7—7 of Fig. 2.

Fig. 8 is a fragmentary section showing one of the plant holders in position for supporting a plant upright or in plant releasing position.

Fig. 9 is a fragmentary side elevation of a modified embodiment of my invention especially adapted for plants having long stems or leaves.

Fig. 10 is a detail section of the embodiment shown in Fig. 9.

Fig. 11 is a fragmentary plan view of a modified form of my invention adapted for the setting of two rows simultaneously.

Referring to the drawing, I provide a main carrying or running gear frame designated generally by the numeral 1 and provided with rear carrying and driving wheels 2 and front carrying and steering wheels 4 connected to the front axle 5 by suitable steering knuckles 6.

An engine indicated conventionally at 3 is disposed with its crank shaft 7 transversely of the main frame and above the rear axle. At the rear of the carrying frame is a jackshaft 8 driven through the sprocket chain 9 from the crank shaft of the engine, this jackshaft being disposed at the rear of the rear axle and being connected to the rear axle by suitable differential not herein illustrated and described, as it forms a part of a structure illustrated and described in a copending application for Letters Patent filed concurrently herewith.

The jackshaft 8 is connected to a transmission shaft 10 which is in turn connected to a driven shaft 11 through the sprocket chain 12 and suitable sprockets. The steering in the embodiment illustrated is effected when the machine is in operation through the steering pawl 13 provided with a tracer wheel. The detail of this is not illustrated here as it is illustrated in my copending application.

To assist in turning the machine at the end of a row I provide a turning wheel 14 which is mounted so that it may be swung to ground engaging position or to a horizontal position, the wheel being connected by a drum 15 and the rope 16 passing over the pulley 17 on the wheel. This steering rope passes over guides 18 and 19.

The drum 15 is carried by a shaft 20 extending to the rear of the frame and provided with a pair of beveled gears 21 adapted to mesh with the beveled gear 22 on the shaft 23. This shaft has a gear 24 meshing with gear 25 on the driving transmission. The gears 21 are shifted so that either may be engaged, thus reversing the drive of the shaft 20. A control lever 26 is connected by the link 27 to the shifting lever 28. This enables the turning of the machine in a comparatively small space.

The turning wheel 14 is mounted on a standard 29 carried by the bar 30 pivoted on the front end of the longitudinal members 31 of the main frame.

I provide a sub-frame consisting of the longitudinal members 32 connected by suitable cross pieces, the rear ends of these longitudinal members being pivoted on the driven shaft 11. The front end of the sub-frame is adjustably supported by a crank-shaped supporting member 33 which is pivotally supported in the bearings 34 on the longitudinal members 31 of the main frame, the crank portion of this supporting member being slidably engaged with the hangers 35 on the forward ends of the longitudinal members of the sub-frame.

The support 33 is provided with an adjusting lever 36. Thus supported the sub-frame may be adjusted to inoperative position as shown in Fig 2 and lowered to operative position merely by swinging the lever 36. The operative position or lowered position of the frame is shown in Fig. 1.

The sub-frame carries at its front end a furrow opener 37 having rearwardly diverging wings 38. The furrow opener is connected to the draw bar 39 by means of the bolt 40 engaging the draw bar for vertical movement and is supported from the sub-frame by a standard 41 which is adjustably secured to the sub-frame for vertical adjustment and also for adjustment longitudinally of the sub-frame.

This is accomplished by providing the standard with a series of holes 42 and the longitudinal members of the sub-frame with a series of holes 43 with which the bolts 44 may be selectively engaged.

The sub-frame is provided with wheels 45 mounted on an axle 46 carried by hangers 47 at the front end of the sub-frame. When the machine is in operation and the sub-frame lowered the front end of the frame is carried by these wheels 45 traveling upon the ground, the sub-frame being a floating frame.

At the rear of the carrying wheels 45 I mount press wheels 48 which are supported in oppositely inclined relation, see Figs. 2 and 3, by the shanks 49 depending from the cross bar 50. This cross bar is yieldingly supported on bolts 51. Springs 52 urge the cross bar 50 yieldingly downward, the bolts being adjustably connected to the supporting cross bar 53 suspended from the side sills of the sub-frame.

On the shaft 11 is a driving sprocket 54 for the plant holder carrying chain 55. At the front end of the sub-frame is a supporting and guiding sprocket 56 for this chain 55, the axle 46 being provided with a supporting and guiding sprocket 57 for the chain. At the rear of the sprocket 57 is a guide sprocket 58 arranged in such relation to the sprocket 57 as to support a portion of the holder carrying and driving chain in a horizontal position, that is, a portion of the bottom reach of the chain is supported so that it travels in a plane parallel with the surface of the ground over which the machine is passing.

A plurality of plant holders designated generally by the numeral 59 are mounted on the carrying chain 55 in suitable spaced relation, the holders being secured to the chain by the pivots 60. These holders are held yieldingly against the chain by the springs 61 which are coiled about the pivots 60, one arm of the spring 62 being engaged with the body portion 63 of the holder and the other arm 64 with a link 65 carrying the pivot. Each holder 59 comprises a body portion 63 chambered at 66 to receive the inner end of the pivoted jaw 67 which is supported in opposed coacting relation to the fixed jaw 68.

The jaw 67 is mounted on a pivot 69 disposed longitudinally of the holder and has a recessed face 70. Elastic grippers 71 extend across this recess and constitute a yielding gripping or plant holding means coacting with the jaws 68.

These yielding gripping members 71 in the embodiment illustrated constitute means for yieldingly holding the pivoted jaw in its open position. The pivoted jaw has a shoulder 72 disposed below and a shoulder 73 on the body 63. The gripping bands 71 are passed over the shoulder on the movable jaw and under the shoulder 73 so that they act to hold the jaw open, see Fig. 5. These yielding grippers coacting with the fixed jaw 68 grasp the plants so that they are firmly held as they are carried along without injury thereto.

As the holders travel along on the upper reach of the feed or holder chain they are supported in upright position as shown in Fig. 5 so that the plants may be laid between the jaws and supported on the shoulder 73 at the base of the fixed jaw. A way 74 is provided to support the upper reach of the holder or conveyor chain which is the charging position.

Tables 75 are disposed at the sides of the upper reach of the conveyors so that the holders travel along between these tables so that the operators may place the plants in the open holders. Seats 76 are arranged at each side on the main frame.

As the holders travel forward with the plants therein their jaws pass between the rearwardly diverging ends 77 of the jaw closing bars 78 which are conformed so that they lie in the path of the holders as they are carried over the sprocket wheel 56 down to the sprocket wheel 57 and as they swing under the same to discharging position.

Each holder is provided with a guide pin 79 projecting transversely from the fixed jaw to engage the inner sides of these bars 78, the bottom portion 80 of the bars being so spaced relative to the carrier chain that the holders, as they pass over the lower sprocket 57, are swung to bring the plant into a vertical position. The holders at this time pass between the diverging wings of the furrow opener and are supported in this position as they are carried rearwardly so that the plant is carried in a vertical position until set and released.

This discharging is effected by permitting the pivoted jaw to swing open, the bottom reach 80 of the bars being diverged at 81, see Figs. 2 and 7, so that the jaw swings open and the plant is released just at the rear of the press wheels or furrow closers 48, see Fig. 2, where one of the holders is in approximately discharging position. The bars are extended beyond this position gradually departing from parallel relation to the holder chain so that the holders gradually swing to erected position under the action of the springs 61.

To insure that the plants will be set with their roots in proper position, that is, in an approximately vertical position and not twisted or turned to one side, the wings of the furrow opener are provided with adjustable gate sections 85 and 86, the furrow openers having longitudinal slots 87 therein to receive the clamping bolts 88. These clamping bolts are not detailed as the relation and adjustment thereof will be apparent to mechanics and others skilled in the art.

The gate members or adjustable sections 85 and 86 are adjusted according to soil conditions so that a restricted or controlled quantity of earth flows through the openings upon the roots as the plants are swung to an upright position when the holders pass over the sprocket 57. Inasmuch as the sprocket chain is driven at the same speed as the machine moves forward, the plant is held in this upright position by the holders until after the soil is firmly pressed upon the roots, when the plant is released as described.

It will be observed that the holders when in discharging position are traveling in a plane substantially parallel to the surface of the ground and it should be pointed out that the holder carrying chain is driven at such speed as to correspond to the speed of travel of the machine over the ground so that when the holders are in discharging position they have substantially no movement relative to the surface of the ground.

This is an important feature as it permits the dropping of the plants in an upright position and without dragging them through the soil or tilting them as they are discharged.

In the embodiment illustrated in Figs. 9 and 10 I show a structure especially adapted for the handling of long plants or plants having long leaves or stalks. In this embodiment the holders 63 are mounted on double conveyor chains 82 so that the tops 83 of the plants projecting from the holders are carried between the pairs of sprockets 84. Otherwise the structure is substantially that described.

In the modification shown in Fig. 11 the machine is adapted for setting two rows of plants simultaneously, there being two conveyors 55 provided with holders and a table 85 between the conveyors.

My improved transplanter is well adapted for plants such as sugar-beets, celery, cauliflower, cabbage and the like, and handles the same without injury. The plants are " set " so that there is little loss in plants.

I have illustrated and described my invention in an embodiment which I have found very satisfactory. I have not attempted to illustrate various adaptations and modifications which I contemplate as I believe this disclosure will enable the adaptation of my improvements as may be desired.

Having thus described my invention what I claim as new and desire to secure by Letters Patent is:

1. In a structure of the class described, the combination of a carrying frame, a furrow opener, an endless conveyor, conveyor supporting and driving sprockets arranged so that the upper reach and a portion of the lower reach of the conveyor are supported in approximately horizontal planes, a plurality of holders mounted on said conveyor by means of pivots disposed transversely of the conveyor and provided with plant holding jaws and with guide pins, springs acting to yieldingly hold said holders in receiving position upon said conveyor, and holder control bars disposed at the sides of the path of the holders to close and retain the jaws in closed position as they are carried from the top reach of the conveyor to the bottom reach thereof, said bars coacting with said pins on said holders to swing the jaws to a horizontal position, said bars being conformed to permit the opening of the pivoted jaw at the rear of the furrow opener, the rear ends of said bars being disposed in a diverging relation relative to the conveyor thereby controlling the return of the holders to receiving position.

2. In a structure of the class described, the combination of a carrying frame, a furrow opener, an endless conveyor, conveyor supporting and driving sprockets arranged so that the upper reach and a portion of the lower reach of the conveyor are supported in approximately horizontal planes, a plurality of holders mounted on said conveyor by means of pivots disposed transversely of the conveyor and provided with plant holding jaws and with guide pins, and holder control bars disposed at the sides of the path of the holders to close and retain the jaws in closed position as they are carried from the top reach of the conveyor to the bottom reach thereof, said bars coacting with said pins on said holders to swing the jaws to a horizontal position, said bars being conformed to permit the opening of the pivoted jaw at the rear of the furrow opener.

3. In a structure of the class described, the combination of a carrying frame, a furrow opener, press wheels disposed at the rear of said furrow opener, an endless conveyor disposed longitudinally of said main frame, driving means for said conveyor whereby the conveyor is driven at a speed corresponding to the speed of travel of the carrying frame over the ground, a plurality of holders pivotally mounted on said conveyor on transverse pivots and provided with coacting jaws, and means for holding said jaws closed as the holders travel from receiving to discharging position and for swinging the holders to bring their jaws to a horizontal rearwardly facing position at the rear of the furrow opener and adjacent said press wheels.

4. In a machine of the class described, the combination of a conveyor disposed longitudinally of the machine, means for driving said conveyor at a speed corresponding to the speed of travel of the machine, a plurality of holders mounted on said conveyor and provided with coacting plant engaging jaws, at least one of the jaws having resilient plant gripping means supported at spaced points, and means for closing said jaws and holding them closed as they move from plant receiving to discharging position.

5. In a machine of the class described, the combination of a conveyor disposed longitudinally of the machine, means for driving said conveyor at a speed corresponding to the speed of travel of the machine, and a plurality of holders mounted on said conveyor and provided with coacting plant engaging jaws, at least one of the jaws having flexible plant gripping means supported at spaced points.

6. In a structure of the class described, the combination of a supporting and transporting means, a furrow opener provided with spaced wings at its rear end, an endless conveyor, supporting and driving sprockets therefor disposed so that a portion of the lower reach of the conveyor is supported in approximately a horizontal plane, a plurality of holders on said conveyor, each comprising a chambered body pivotally mounted on said conveyor and provided with a fixed jaw shouldered at its lower end, a movable jaw having a recessed face pivoted within said chamber and provided with a shoulder disposed below said shoulder of said fixed jaw, elastic bands arranged about said fixed jaw extending across its said recess and into engagement with said shoulders on said jaws whereby the bands provide a resilient grip and act to normally hold the movable jaw in open position, said holders being provided with laterally projecting pins, springs acting to yieldingly hold said holders in receiving position upon said conveyors, and holder control bars disposed at the sides of the path of the holders to close and retain the jaws in closed positions as they are carried from the top reach of the conveyor to the bottom reach thereof, said bars acting with said pins on said holders to swing the holders on their pivots as they are carried around the sprocket on said axle, said bars being cammed to permit the opening of the pivoted jaw at the rear of but adjacent to the press wheels.

7. In a structure of the class described, the combination of a supporting and transporting means, a furrow opener provided with spaced wings at its rear end, an endless conveyor, supporting and driving sprockets therefor disposed so that a portion of the lower reach of the conveyor is supported in approximately a horizontal plane, a plurality of holders pivotally mounted on said conveyor and provided with jaws, one of which has a yielding grip, said holders being provided with laterally projecting pins, springs acting to yieldingly hold said holders in receiving position upon said conveyors, a pair of holder control bars disposed at the sides of the path of the holders to close and retain the jaws in closed positions as they are carried from the top reach of the conveyor to the bottom reach thereof, said bars coacting with said pins on said holders to swing the holders on their pivots as they are carried around the sprocket on said axle, said bars being cammed to permit the opening of the pivoted jaws at the rear of but adjacent to the press wheels, the rear ends of said bars being disposed in a diverging relation relative to the path of the conveyor, thereby controlling the return of the holders to receiving position.

8. In a structure of the class described, the combination of a supporting and transporting means, a furrow opener provided with spaced wings at its rear end, an endless conveyor, supporting and driving sprockets therefor disposed so that a portion of the lower reach of the conveyor is supported in approximately a horizontal plane, a plurality of holders pivotally mounted on said conveyor and provided with jaws, one of which has a yielding grip, said holders being provided with laterally projecting pins, springs acting to yieldingly hold said holders in receiving position upon said conveyors, a pair of holder control bars disposed at the sides of the path of the holders to close and retain the jaws in closed positions as they are carried from the top reach of the conveyor to the bottom reach thereof, said bars coacting with said pins on said holders to swing the holders on their pivots as they are carried around the sprocket on said axle, said bars being cammed to permit the opening of the pivoted jaw at the rear of but adjacent to the press wheels.

9. In a structure of the class described, a conveyor, a plurality of holders on said conveyor each comprising a chambered body mounted on said conveyor and provided with a fixed jaw shouldered at its lower end, a movable jaw having a recessed face pivoted within said chamber and provided with a shoulder disposed below said shoulder of said fixed jaw, elastic bands arranged about said fixed jaw extending across its said recess and into engagement with said shoulders on said jaws whereby the bands provide a resilient grip and act to normally hold the movable jaw in open position, said holders being provided with laterally projecting pins, and holder control bars disposed at the sides of the path of the holders to close and retain the jaws in closed position.

10. In a structure of the class described, the combination of a main carrying frame, a sub-frame pivotally mounted at its rear end, supporting wheels for the front end of said sub-frame, a furrow opener on said sub-frame, an endless conveyor, conveyor supporting and driving sprockets arranged so that the upper reach and a portion of the lower reach of the conveyor are supported in approximately horizontal planes, a plurality of holders on said conveyor, each comprising a body pivotally mounted on said conveyor and provided with a fixed jaw, a coacting movable jaw pivoted on said body member, means for holding said jaws normally open, said holders being provided with laterally projecting pins, and holder control bars disposed at the sides of the path of the holders to close and retain the jaws in closed position as they are carried from the top reach of the conveyor to the bottom reach thereof, said bars coacting with said pins on said holders to swing the jaws to a horizontal position, said bars being conformed to permit the opening of the pivoted jaw at the rear of the furrow opener.

11. In a machine of the class described, the combination with a furrow opener, a conveyor element provided with plant holders each comprising a normally open jaw member provided with a flexible resilient plant gripping element supported at spaced points to permit it to yieldingly engage a plant, means for successively closing said jaws and retaining them in closed position during a portion of the travel thereof, and a furrow closing means disposed to act while the plants are still supported by said holders.

12. In a machine of the class described, the combination with a furrow opener, a conveyor element provided with plant holders each comprising a normally open jaw member provided with a flexible plant gripping element supported at spaced points to permit it to yieldingly engage a plant, means for successively closing said jaws and retaining them in closed position during a portion of the travel thereof, and a furrow closing means disposed to act while the plants are still supported by said holders.

13. In a structure of the class described, the combination with a conveyor element provided with plant holders each comprising a normally open jaw member provided with a flexible plant gripping element supported at spaced points to permit it to yieldingly engage a plant, and means for successively closing said jaws and retaining them in closed position during a portion of the travel thereof.

14. In a machine of the class described, the combination of a conveyor element provided with a plurality of plant holders, each comprising a jaw member provided with a flexible plant gripping element supported at spaced points to permit it to yieldingly engage a plant.

In witness whereof I have hereunto set my hand.

SIMON W. VOLLINK.